United States Patent [19]

Curtis

[11] 3,890,216

[45] June 17, 1975

[54] MANUFACTURE OF HYDRAZINE

[75] Inventor: David Curtis, Bassersdorf, Switzerland

[73] Assignee: Hooker Chemicals & Plastics Corporation, Niagara Falls, N.Y.

[22] Filed: June 24, 1974

[21] Appl. No.: 482,110

Related U.S. Application Data

[63] Continuation-in-part of Ser. No. 317,011, Dec. 20, 1972, abandoned.

[52] U.S. Cl................................. 204/177; 423/407
[51] Int. Cl............................................ C01b 21/16
[58] Field of Search..................... 204/177; 423/407

[56] References Cited
UNITED STATES PATENTS

| | | | |
|---|---|---|---|
| 3,020,223 | 2/1962 | Manion............................. | 204/177 |
| 3,396,098 | 8/1968 | Manion et al.................. | 423/407 X |

FOREIGN PATENTS OR APPLICATIONS

| | | | |
|---|---|---|---|
| 896,113 | 5/1962 | United Kingdom................ | 204/177 |
| 958,776 | 5/1964 | United Kingdom................ | 204/177 |
| 958,777 | 5/1964 | United Kingdom................ | 204/177 |
| 958,778 | 5/1964 | United Kingdom................ | 204/177 |

OTHER PUBLICATIONS

Ind. & Eng. Chemistry 51 (4) 527–530 by Andersen et al., (1959), copy in Sci. Lib.

Chem. Engineering Sci., 26 2087–2098 (1971), by Spedding et al.

*Primary Examiner*—F. C. Edmundson
*Attorney, Agent, or Firm*—Peter F. Casella; Donald C. Studley; William J. Crossetta, Jr.

[57] ABSTRACT

An improved process for the manufacture of hydrazine by the treatment of ammonia in an electric discharge is disclosed, the improvement comprising subjecting the ammonia to an electric glow discharge, at a temperature of from about −10° centigrade to about −70° centigrade, under a pressure of from about 100 to about 400 millimeters of mercury.

10 Claims, No Drawings

MANUFACTURE OF HYDRAZINE

This application is a continuation-in-part of Ser. No. 317,011, filed Dec. 20, 1972, and now abandoned This invention relates to the synthesis of hydrazine from ammonia in an electric glow discharge and more particularly to an improved method of such synthesis.

The invention provides a continuous process and apparatus for subjecting ammonia to an electric glow discharge wherein the electric discharge is accomplished at a temperature from about −10° centigrade to about −70° centigrade, under a pressure from about 100 to about 400 millimeters of mercury.

BACKGROUND OF THE INVENTION

The manufacture of hydrazine, with the concomitant production of elemental nitrogen and hydrogen, by subjecting gaseous ammonia to an electrical glow discharge is well known to the art. That the efficiency of production and the amount of hydrazine produced varies with the reaction parameters of the discharge is also well known in the art.

Improvement in the yield of hydrazine, per kilowatt hour of power supplied, may be obtained by effecting the electrical glow discharge at reduced pressures and rapid ammonia flow rate, low current densities being desirable to achieve favorable energy yield (*The Chemistry of Hydrazine*, Audrieth and Ogg, J. Wiley and Sons (1959) pp. 23, 24).

The prior art is replete with processes attempting the economical glow discharge of hydrazine from ammonia. U.S. Pat. No. 2,849,357 provides for a low pressure (3–10 millimeters of mercury) discharge process utilizing a current density of from about 0.6 – 6.0 milliamperes wherein the temperature is maintained at about 200° centigrade and not in excess of about 350° centigrade, e.g., the decomposition point of hydrazine. U.S. Pat. No. 3,401,108 takes an opposite tack wherein a pressure of about 10 to about 100 millimeters of mercury, a current density of at least 40 milliamperes and a temperature of about 400° to 650° centigrade is utilized. Even though moderately successful over the prior art, the yields of hydrazine produced by both processes have been disappointing as the percentage of ammonia decomposed was quite low under conditions giving the most favorable yield, and yields in terms of energy input have been discouraging.

It is an object of this invention to provide an electrical discharge method for obtaining hydrazine from ammonia in good yield. Another object is to provide a novel method for producing hydrazine. A further objective is to provide a method for obtaining hydrazine from ammonia in higher yield per kilowatt hour input. Still another object of the invention is to provide a method for making hydrazine by electrically exciting ammonia flowing continuously through a glow discharge chamber. Numerous other objects and advantages will become apparent from the following detailed description.

In accordance with the objects of this invention a process is disclosed wherein ammonia is subjected to an electric glow discharge, at a temperature of from about −10° centigrade to about −70° centigrade, under a pressure of from about 100 to about 400 millimeters of mercury.

A preferred embodiment of the above process comprises a continuous recycle process wherein the product of the above described electric discharge is heated to a temperature sufficient to vaporize unreacted ammonia therein; separating out the hydrazine product therefrom; condensing the vaporized ammonia; and recycling the condensed ammonia to the electric discharge.

Typically, the process can be accomplished by heating the reactants, in a reservoir, to a temperature sufficient to cause vaporization thereof and passing the vaporized reactants to a condenser where they are condensed to a liquid. The liquefied reactants are then passed to an electric-discharge chamber where the production of hydrazine is affected. The resulting mixture of products and unreacted starting materials may then be passed from the discharge chamber back to the reservoir, where they may be collected, separated and recycled. The reservoir may be tapped to remove hydrazine and/or to replenish depleted ammonia. The difference in vaporization temperatures of hydrazine and unreacted starting materials provide a simple separation procedure. Ammonia may be replenished at any point throughout the cycle. $H_2$ and $N_2$ may be removed at the electric discharge chamber. The above illustrates one embodiment of the invention for a continuous recycle operation wherein the product of the electric discharge is continuously removed from the reaction center, thereby avoiding decomposition thereof, while being continuously concentrated in a receiver for continuous production and is not meant to be a limitation of the invention.

In operation of this invention, subjection of ammonia to electric glow discharge treatment can also be accomplished in the presence particularly of allyl compounds and in general, of acylic compounds characterized by ethylenic unsaturation and containing two to eight carbon atoms. These organic additive compounds are utilized within low concentration limits and may be effective to increase the energy yield of the hydrazine produced. The organic additives may be replenished to any point in the cycle. Likewise the electrodes utilized in the glow discharge apparatus may be any of a myriad of types and configurations which may increase the energy yield of the hydrazine produced. It is preferred that the electrodes be positioned so that the glow discharge is maintained at the liquid-vapor interface. A manner in which this can be accomplished is to position the electrodes just below the surface of the liquid phase. The distance between the electrodes may be varied, as shown in the examples. A greater distance usually requires an increase in voltage. A preferred voltage range is from about 300 to about 5,000 volts. A preferred current density is from about 300 to about 3,000 milliamperes per $cm^2$.

To illustrate the manner in which the process of the present invention may be carried out, the following examples are given. It is to be understood, however, that the examples are for the purpose of illustration and the invention is not to be limited to the specific conditions or materials recited therein.

EXAMPLE 1

A reservoir, condenser and electric discharge chamber were assembled as above described and maintained at a pressure of 150 to 180 millimeters of mercury. The electric discharge chamber contained two nickel-plated tungsten electrodes, having cross section areas of 0.02 $cm^2$ and an electric discharge separation therebetween of 9 millimeters, and was operated at 1,200 volts and 35 milliamperes of current; the electrodes were positioned so that a glow discharge was maintained at the liquid-vapor interface. The condenser and discharge chamber were maintained at −60° centigrade by external cooling. The reservoir was maintained at a temperature sufficient to cause vaporization of the ammonia. Ammonia was charged to the apparatus and the reaction was run for 1.5 hours. 0.986 grams/KWH of $N_2H_4$ was recovered.

EXAMPLE 2

The process of Example 1 was repeated with the exception that the electric discharge space was decreased to 2 millimeters, voltage was maintained at a constant 300 volts and current was 30 milliamperes. Ammonia was charged to the apparatus and the reaction run for 1.0 hours. 3.8 grams/KWH of $N_2H_4$ was recovered.

I claim:

1. A continuous recycle process for the manufacture of hydrazine comprising the steps of;
    1. In an electric discharge chamber, subjecting ammonia to an electric glow discharge at a temperature of from about −10° centigrade to about −70° centigrade, under a pressure of from about 100 to about 400 millimeters of mercury;
    2. Continuously transporting the product of step (1) to a reservoir and heating it to a temperature sufficient to vaporize unreacted ammonia in said product;
    3. Removing liquid hydrazine from said reservoir,
    4. Transporting vaporized ammonia to a condenser and condensing the vaporized ammonia of step (2); and
    5. recycling the condensed ammonia to step (1).

2. The process of claim 1 wherein steps (1), (2) (3) and (4) are under a pressure of from about 100 to about 400 millimeters of mercury.

3. The process of claim 2 wherein the pressure is from about 150 to about 180 millimeters of mercury.

4. The process of claim 1 wherein the pressure is from about 150 to about 180 millimeters of mercury.

5. The process of claim 1 wherein ammonia is subjected to electric discharge in the presence of an allyl compound.

6. The process of claim 1 wherein ammonia is subjected to electric discharge in the presence of acylic compounds containing 2 to 8 carbon atoms and ethylenically unsaturated.

7. The process of claim 1 wherein the electric discharge is at a voltage of from about 300 to about 5,000 volts.

8. The process of claim 1 wherein ammonia is continuously added thereto.

9. The process of claim 1 wherein ammonia is subjected to the electric discharge of step (1) at a liquid-vapor interface.

10. The process of claim 1 wherein said glow discharge is at a current density of from about 300 to about 3,000 milliamperes per $cm^2$.

* * * * *